(12) United States Patent
Partanen et al.

(10) Patent No.: US 6,888,828 B1
(45) Date of Patent: May 3, 2005

(54) SYSTEM AND METHOD FOR PROVIDING AT LEAST ONE SERVICE OBTAINED FROM A SERVICE NETWORK FOR A USER IN A PACKET SWITCHED COMMUNICATION NETWORK

(75) Inventors: Tiina Partanen, Tampere (FI); Jouni Lunden, Lempäälä (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 09/967,927

(22) Filed: Oct. 2, 2001

(51) Int. Cl.[7] .......................... H04L 12/16; H04L 12/66
(52) U.S. Cl. .................... 370/389; 370/259; 370/351; 370/401
(58) Field of Search .................. 370/389, 392, 370/400–402, 259–269, 351–356, 546, 428; 455/414–417; 709/223, 238, 230, 228

(56) References Cited

U.S. PATENT DOCUMENTS

| | | | | |
|---|---|---|---|---|
| 6,625,141 | B1 * | 9/2003 | Glitho et al. | 370/352 |
| 2001/0049790 | A1 * | 12/2001 | Faccin et al. | 713/185 |
| 2002/0120691 | A1 * | 8/2002 | Patil et al. | 709/206 |
| 2002/0120729 | A1 * | 8/2002 | Faccin et al. | 709/223 |
| 2002/0120746 | A1 * | 8/2002 | Patil et al. | 709/227 |
| 2002/0120759 | A1 * | 8/2002 | Faccin et al. | 709/230 |
| 2002/0128008 | A1 * | 9/2002 | Phan-Anh et al. | 455/424 |
| 2002/0129236 | A1 * | 9/2002 | Nuutinen | 713/151 |
| 2002/0136206 | A1 * | 9/2002 | Gallant et al. | 370/352 |
| 2002/0136370 | A1 * | 9/2002 | Gallant | 379/90.1 |
| 2003/0074452 | A1 * | 4/2003 | Zheng et al. | 709/228 |

OTHER PUBLICATIONS

SIP:Session Initiation Protocol, SIP Protocol Specification, RFC 2543, pp. 1–143.*
3rd Generation Partnership Project; Technical Specification Group Services and System Aspects IP Multimedia (IM) Subsystem–Stage 2 (Release 5), 3GPP TS 23.228 v.5.0.0 (Apr. 2001, pp. 1–126).

CPL, Call Processing Language, Internet Engineering Task Force (IETF draft. Nov. 14, 2000), pp. 1–60.

SIP: Session Initiation Protocol, Chapters 6.28 and 6.20 of SIP Protocol Sepcification, RFC 2543, pp. 1–143.

Handley et al, SIP: Session Initiation Protocol Network Working Group RFC 2543, Mar. 1999, Sections 4.2.2 and 6.40.1.

* cited by examiner

*Primary Examiner*—Steven Nguyen
(74) *Attorney, Agent, or Firm*—Antonelli, Terry, Stout & Kraus, LLP

(57) ABSTRACT

The present invention is a network, service network entities, and a method for providing users of a packet switched communication network (32) with access to services obtained from a private service network (34). A method of providing at least one service obtained from a service network for a user in a packet switched communication network originating at an originating network entity in the packet switched communication network a service request which is transmitted to a controlling entity in the service network, the service request triggering at least one service to be provided to the user; the controlling entity formulating a service route comprising at least one service providing server with each service providing server processing the service request on the service route and an allocation of how each service providing server is to provide the at least one service; and transmitting the service request, the allocation and any service instructions along the service route from the controlling entity through each service providing server and then the request for service and the at least one service from a last service providing server or the controlling entity on the service route to the packet switched communication network and thereafter to a network entity in the packet switched communication network.

80 Claims, 11 Drawing Sheets

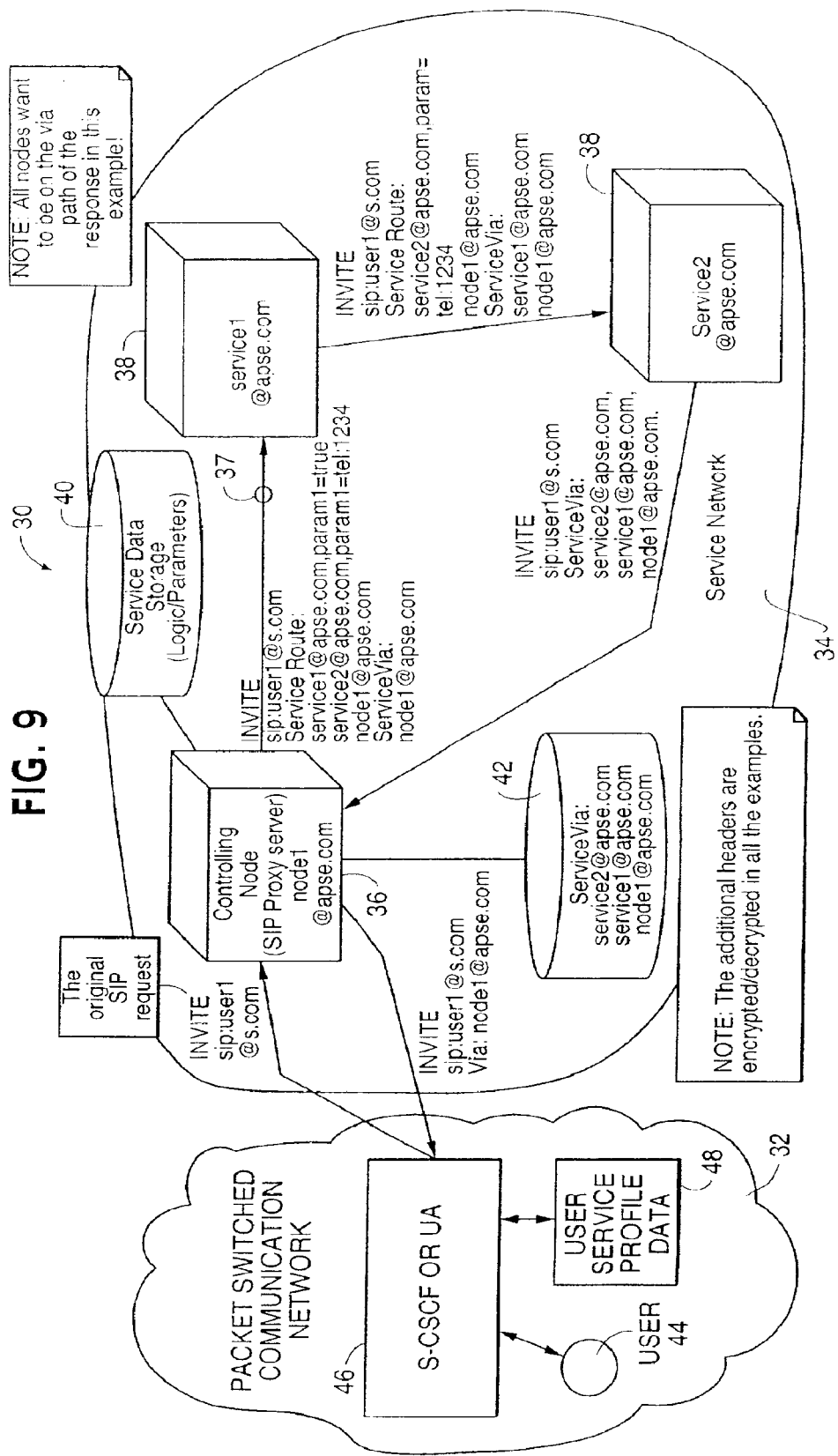

FIG. 10

```
<?xml version="1.0" ?>
<!DOCTYPE cpl PUBLIC -//IETF//DTD RFCxxxx CPL 1.0//EN" "cpi.dtd">

<cpl xmlns="http://www.ietf.org/internet-drafts/draft-ietf-iptel-cpl-03.txt"
     xmlns:apse="http://www.nokia.com/apsel-extensions">
<outgoing>
    <address-switch field="original-destination">
        <address is="friend@operator.com">
        <apse:service url="sip:personalService@apse.sonera.com" param1="true"/>
        <string-switch field="subject">
            <string contains="Secret service">
                <apse:service url="sip:secretServices@apse.sonera.com"/>
            </string>
        </string-switch>
        </address>
    </address-switch>
    <address-switch field="original-destination" subfield="host">
        <address subdomain-of="nokia.com">
        <apse:service url="sip:prepaidService@apse.sonera.com"
param1="223345566"/>
        </address>
    </address-switch>
</outgoing>
</cpl>

ServiceRoute after running the above CPL script for an outgoing call with a destination of "friend@operator.com"
    ServiceRoute: personalService@apse.sonera.com, param1=true;
        secretServices@apse.sonera.com
```

SYSTEM AND METHOD FOR PROVIDING AT LEAST ONE SERVICE OBTAINED FROM A SERVICE NETWORK FOR A USER IN A PACKET SWITCHED COMMUNICATION NETWORK

FIELD OF THE INVENTION

The present invention relates to networks, service network entities and methods for obtaining services for users in a packet switched communication network from a service network.

DESCRIPTION OF THE PRIOR ART

FIG. 1 illustrates a functional architecture for provision of services in an IP multimedia core network subsystem (IMS) 11 in accordance with the 3GPP TS 23.228 v 5.1.0 (2001-06) which is incorporated herein by reference in its entirety. The IMS 11 uses the packet switched domain 10 which is connected to the circuit switched domain 10' of the core network 13 to provide multimedia services. The core network 13 includes a home subscriber server (HSS) 12 which stores subscriber and service subscription information and a serving call session control function (S-CSCF) 14. The provision of services in IMS 11 involves application servers 17 including a session initiation protocol (SIP) application server 20 each having known functions. The aforementioned entities involved in provision of services communicate with the identified protocols/interfaces which label the connections there between. Cx is the interface between the HSS 12 and the S-CSCF 14; Sh is the interface between the HSS and the SIP application server 20; and $SIP^+$ is the interface between the S-CSCF and the SIP application server in accordance with the foregoing specification.

While the core network 13 provides a set of services utilizing the session initiation protocol (SIP), there is a need for users thereof to access services from specialized service platforms or service networks. While the 3GPP Technical Specification referred to above permits accessing of services for users of user equipment (UE) from either the internal service platform 13" of the home network 13' of FIG. 11 or from the external service platform 13" from outside the home network 13' of FIG. 12 by the use of service requests, such as the SIP INVITE message, there is a need to implement services in the application servers to respond to carrier grade performance requirements. Gm is the interface between the serving CSCF and the P-CSCF and Gm is the interface between the P-CSCF and the UE in accordance with the foregoing specification. New services are required to be deployed faster and faster so there is a need to provide a scalable and fault tolerant, yet flexible architecture to implement versatile multimedia services. However, the SIP protocol does not contain a mechanism for accessing and allocating services between multiple servers contained in a service network addressed by a single routable address.

SUMMARY OF THE INVENTION

The present invention is a method, network and entities within a service network which provide at least one service for a user in a packet switched communication network. With the invention, a service request such as, but not limited to, the SIP INVITE message is originated at an originating network entity in a packet switched communication network which is transmitted to a controlling entity in the service network. The service request triggers the controlling entity to specify at least one service to be provided to the user through the allocation of services to at least one service providing server in the service network. The controlling entity formulates a service route such as, but not limited to, a modification of the SIP Service Route, on which is located at least one service providing server which provides an allocation of how each service providing server is to provide the at least one service. A response route such as, but not limited to, a modification of the SIP Service Via, is transmitted with the service request to which is added, as the service request is routed, along the service route each service providing server and the controlling entity which is to receive the response.

The invention may be practiced in diverse network topologies using diverse protocols. However, in a preferred embodiment, the packet switched communication network may be in accordance with the aforementioned 3GPP Technical Specification. A preferred protocol used by the service network is the SIP protocol which starts a session with the INVITE message and uses modifications of the SIP Protocol, such as Service Route, Ser vice Via and Record Service Route fields to specify how the service network operates to provide the at least one service. Furthermore, it should be understood that the preferred embodiment of the invention as described below, while described in terms of SIP entities, is not limited thereto.

The service network transmits the service request, the allocation and any service instructions along the service route from the controlling entity through each service providing server and then the request for service and the at least one service from a last service providing server or the controlling entity on the service route to the packet data network and thereafter to the network entity. Each of the at least one service providing server attempts to perform the service allocated thereto and passes at least the service request, the allocation and any performed service to any next service providing server remaining on the service route.

The last service providing server or the controlling entity on either the service route or response route of the service network at the time of communicating with the packet switched communication network has the option of either stripping and storing the information added to the service route or response route at the time of communication with the packet switched communication network at the last entity on the service route or response route or alternatively encrypting that information in the communication with the packet switched communication network. In either mode of operation, the objective is to make the function of the service network transparent to the packet switched communication network when passing the service request or service response to the packet switched communication network.

The packet data network or an entity connected thereto generates a response to reception of the service request from a last service providing server or the controlling entity on the service route from which the at least one service was transmitted to the network entity. The last service providing server or the controlling entity stores a complete response route through the service network comprising at least one of the at least one service providing server and/or the controlling entity. Each of the at least one service providing server on the service route has, when receiving the service request, an option to store a response route to at least one of the service providing server and/or the controlling entity to which the response is forwarded thereby and to request receiving the response with the service request. The request to receive the response is transmitted to and stored at a next server on the service route to which the response is to be transmitted. Each service providing server to which the response is transmitted forwards the response to another service providing server on the response route or to the controlling entity based upon the response stored thereat.

A method of providing at least one service obtained from a service network for a user in a packet switched communication network in accordance with the invention includes originating at an originating network entity in the packet switched communication network a service request which is transmitted to a controlling entity in the service network, the service request triggering at least one service to be provided to the user, the controlling entity formulating a service route comprising at least one service providing server with each service providing server processing the service request on the service route and an allocation of how each service providing server is to provide the at least one service; and transmitting the service request, the allocation and any service instructions along the service route from the controlling entity through each service providing server and then the request for service and the at least one service from a last service providing server or the controlling entity on the service route to the packet switched communication network and thereafter to a network entity in the packet switched communication network; and wherein each of the at least one service providing server attempts to perform the service allocated thereto and passes at least the service request, the allocation and any service instructions to any next service providing server remaining on the service route. The service request may be made using the session initiation protocol (SIP); and the controlling entity may be a proxy server.

A last service providing server or the controlling entity on the service route may remove any service routing related information added to the service request by the controlling entity or any preceding service providing server and may transmit the at least one service and the service request in a protocol used by the packet switched communication network and thereafter to a network entity in the packet switched communication network.

The packet switched communication network or an entity in the packet switched communication may generate a response to reception of the service request which is transmitted to a last service providing server or the controlling entity on the service route and the last service providing server or the controlling entity may provide a complete response route through the service network comprising at least one of the at least one service providing server and/or the controlling entity; each of the at least one service providing server on the service route may, when receiving the service request, have an option to store a response route to at least one of a service providing server and/or the controlling entity to which the response is forwarded thereby and to request receiving the response with the service request and the request to receive the response may be transmitted to and stored at a next server on the service route that the response is to be transmitted thereto; and each service providing server to which the response is transmitted on the response route may forward the response to another service providing server on the response route or to the controlling entity based upon the response route stored thereat.

A response route may be transmitted with the service request to which is added as the service request is routed along the service route each service providing server and the controlling entity which is to receive the response; and the last service providing server or the controlling entity on the service route may transmit with the service request and the at least one service an address of the last service providing server or the controlling entity which is to receive the response from the packet switched communication network or an entity within the packet switched communication network; and thereafter the response may be transmitted from the packet switched communication network to the address.

A response route may be transmitted with the service request to which is added as the service request is routed along the service route each service providing server and the controlling entity which is to receive the response; the last service providing server or the controlling entity on the service route may cause storage of a complete response route which is used by the last service providing server or the controlling entity to initiate the response route through which the response is routed upon receipt from the packet switched communication network; and at least one of the controlling entity or a last service providing server on the response route may transmit the response in a protocol used by the packet switched communication network to the packet switched communication network and thereafter to a network entity in the packet switched communication.

The controlling entity or a service providing server on the response route which transmits the response to the packet switched communication network may remove any service routing related information added to the response by the service network.

The packet switched communication network may include a storage which stores information pertaining to the at least one service to be provided to the user; and the originating network entity may access the storage to formulate the service request.

The service network may include a storage which stores at least parameters pertaining to the at least one service to be provided to the user and the originating network entity may access the storage to formulate the service request.

The service request may be formulated by the controlling entity using service parameters with the service parameters being forwarded with the service instructions and the service request to each service providing server and the service parameters may be fetched from a storage in the packet switched communication network or the service parameters may be fetched from a storage in the service network.

The controlling entity may add a field to the service request to indicate any mandatory supported service feature of the service request and each service providing server on the service route may inspect and issue a response thereto if that service providing server does not support any mandatory supported feature; and the last service providing server or the controlling entity on the service route may remove the field prior to transmission of the service request and the at least one service to the packet switched communication network.

Each service providing server which provides any mandatory supported service feature, may issue a response to the controlling entity that service processing is ongoing.

The request for service may be part of a session which contains multiple requests for service which are all addressed to the controlling entity; and the controlling entity may formulate the service route during a first service request of the session which is used for subsequent service requests of the session.

The controlling entity may add a field to the first service request to which each service providing server on the service route may add a response that records if that service providing server wants to receive subsequent requests in the same session; and the last service providing server or the controlling entity on the service route may remove or encrypt the field prior to transmissions during the session to the packet switched communication network.

An allocation of the at least one service performed by the service network may be changed dynamically to change services performed by individual service providing servers.

One of the at least one service providing servers may add at least one additional service providing server to the service route to provide the at least one service.

A system which provides at least one service to a user of a packet switched communication network including an originating network entity, the at least one service being obtained from a service network in accordance with the invention including a controlling entity and at least one service providing server wherein the originating network entity in the packet switched communication network originates a service request which is transmitted to the controlling entity in the service network, the service request triggering at least one service to be provided to the user; the controlling entity formulating a service route comprising at least one service providing server with each service providing server processing the service request and an allocation of how each service providing server is to provide the at least one service; the service request, the allocation and any service instructions are transmitted by the service network along the service route from the controlling entity through each service providing server and then the request for service and the at least one service from a last service providing server or the controlling entity on the service route to the packet switched communication network and thereafter to the network entity in the packet switched communication network; and each of the at least one service providing server attempts to perform the service allocated thereto and passes at least the service request, the allocation and any service instructions to any next service providing server remaining on the service route. The service request may be made using the session initiation protocol (SIP); and the controlling entity may be a proxy server.

A last service providing server or the controlling entity on the service route may remove any service routing related information added to the service request by the controlling entity or any preceding service providing server and may transmit the at least one service and the service request in a protocol used by the packet switched communication network to the packet switched communication network and thereafter to a network entity in the packet switched communication network.

A last service providing server or the controlling entity on the service route may encrypt any service routing related information added to the service request by the controlling entity or any preceding service providing server and may transmit the at least one service, the service request and the encrypted information in a protocol used by the packet switched communication network to the packet switched communication network and thereafter to a network entity.

The packet switched communication network or an entity in the packet switched communication may generate a response to reception of the service request which is transmitted to a last service providing server or the controlling entity on the service route and the last service providing server or the controlling entity may provide a complete response route through the service network comprising at least one of the at least one service providing server and/or the controlling entity; each of the at least one service providing server on the service route may, when receiving the service request, have an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route may forward the response to another service providing server on the response route or to the controlling entity based upon the response route stored thereat.

A response route may be transmitted with the service request to which may be added as the service request is routed along the service route each service providing server and the controlling entity which is to receive the response; the last service providing server or the controlling entity on the service route may transmit with the service request and the at least one service an address of the last service providing server or the controlling entity which is to receive the response from the packet switched communication network or an entity within the packet switched communication network; and thereafter the response may be transmitted from the packet switched communication network to the address.

A response route may be transmitted with the service request to which may be added as the service request is routed along the service route each service providing server and the controlling entity which is to receive the response; the last service providing server or the controlling entity on the service route may cause storage of a complete response route which is used by the last service providing server or the controlling entity to initiate the response route through which the response is routed upon receipt from the packet switched communication network; and at least one of the controlling entity or a last service providing server on the response route may transmit the response in a protocol used by the packet switched communication network to the packet switched communication network and thereafter to a network entity in the packet switched communication network.

The controlling entity or a service providing server on the response route which transmits the response to the packet switched communication network may remove any service routing related information added to the response by the service network.

The packet switched communication network may include a storage which stores information pertaining to the at least one service to be provided to the user; and the originating network entity may access the storage to formulate the service request.

The service network may include a storage which stores at least parameters pertaining to the at least one service to be provided to the user; and the controlling entity may access the storage to formulate the service request.

The service request may include service parameters added by the controlling entity to the service request with the service parameters being used by the service network in obtaining the at least one service. The service parameters may be fetched from a storage in the packet switched communications network or the service parameters may be fetched from a storage in the service network.

Each service providing server may interpret the service request and signal the controlling entity if the service providing server does not support any part of the service request.

The service request may be formulated by the controlling entity using service parameters with the service parameters being forwarded with the service instructions and the service request to each service providing server. The service parameters may be fetched from a storage in the packet switched communications network or the service parameters may be fetched from a storage in the service network.

The request for service may be part of a session which contains multiple requests for service which are all addressed to the controlling entity and the controlling entity may set the service route during a first service request of the session which is used for subsequent service requests of the session.

The controlling entity may add a field to the first service request to which each service providing server on the service route may add a response that records if that service providing server wants to receive subsequent requests in the same session and the last service providing server on the service route or the controlling entity may remove the field prior to transmissions during the session to the packet switched communication network.

In a system which provides at least one service for a user in a packet switched communication network including an originating network entity which originates a service request triggering the at least one service and a service network including at least one service providing server, a service network entity in accordance with the invention includes a controlling entity in the service network to which the service request is transmitted, the controlling entity formulating a service route comprising at least one service providing server which processes the service request on the service route and an allocation of how each service providing server is to provide the at least one service, and wherein the service network transmits the service request, the allocation and any performed service instructions along the service route from the controlling entity through each service providing server and then the request for service and the at least one service from a last service providing server or the controlling entity on the service route to the packet switched communication network and thereafter to a network entity in the packet switched communication, and each of the at least one service providing server attempts to perform the service allocated thereto and passes at least the service request, the allocation and any service instructions to any next service providing server remaining on the service route. The controlling entity may support the session initiation protocol (SIP).

Each service providing server may interpret the service request and signal the controlling entity if the service providing server does not support any part of the service request.

The controlling entity may add a field to the service request to indicate any mandatory supported service feature of the service request and each service providing server on the service route may inspect and issue a response if that service providing server does not support any mandatory supported service and the last service providing server on the service route may remove the field prior to transmission of the service request and the at least one service request to the packet switched communication network.

Each service providing server which provides any mandatory supported service features may issue a response to the controlling entity that service processing is ongoing.

The request for service may be part of a session which contains multiple requests for service which are all addressed to the controlling entity and the controlling entity may set the service route during a first service request of the session which is used for subsequent service requests of the session.

The controlling entity may add a field to the first service request to which each service providing server on the service route may add a response that records if that service providing server wants to receive subsequent requests in the same session and the last service providing server on the service route or the controlling entity may remove or encrypt the field prior to transmissions during the session to the packet switched communication network.

In a system which provides at least one service for a user in a packet switched communication network including an originating network entity which originates a service request triggering the at least one service and a service network including a controlling entity to which the service request is transmitted and which formulates a service route, at least one service network entity in accordance with the invention includes at least one service providing server which processes the service request on the service route and an allocation provided by the controlling entity of how the service providing server is to provide at least part of the at least one service; and wherein the service network transmits the service request, the allocation and any service instructions along the service route from the controlling entity through each service providing server and then the request for service and the at least one service from a last service providing server or the controlling entity on the service route to the packet switched communication network and thereafter to a network entity in the packet switched communication; and each of the at least one service providing server attempts to perform the service allocated thereto and passes at least the service request, the allocation and any service instructions to any next service providing server remaining on the service route. Each service network entity may support the session initiation protocol (SIP).

BRIEF DESCRIPTION OF THE DRAWINGS

FIG. 9 illustrates an alternative to the routing of a service request 1, in which the last location in the service network from which the service request is transmitted is from a controlling entity in the service network.

FIG. 10 illustrates an example of the use of extended CPL script as a service logic incorporating some service parameters for creating a service route for an outgoing call.

DESCRIPTION OF THE PREFERRED EMBODIMENTS

Figure 1:
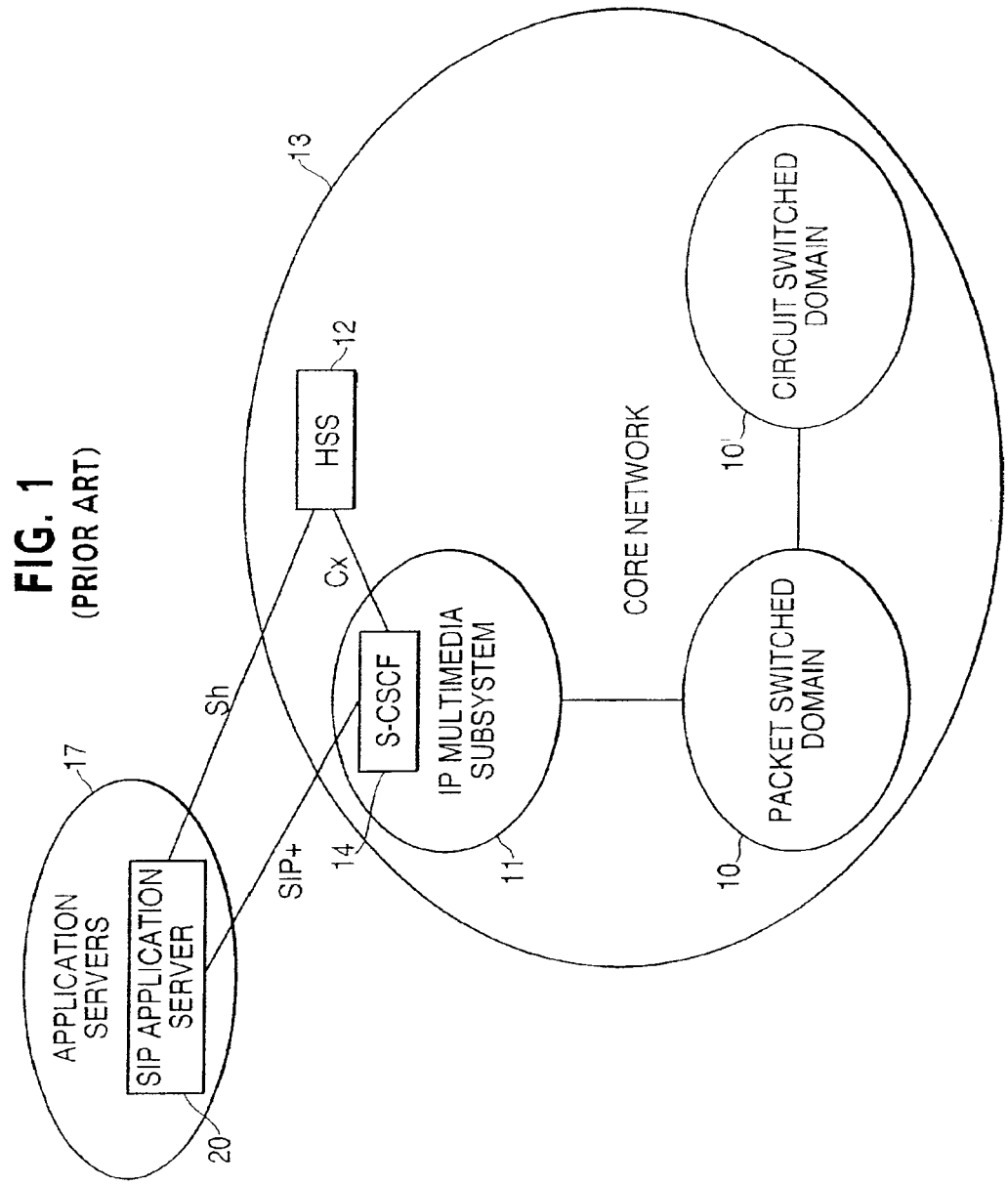
FIG. 1 illustrates a block diagram of a prior art IP multimedia subsystem in accordance with FIG. 4 of Section 4.2.4 of the aforementioned 3GPP Technical Specification.
Figure 2:
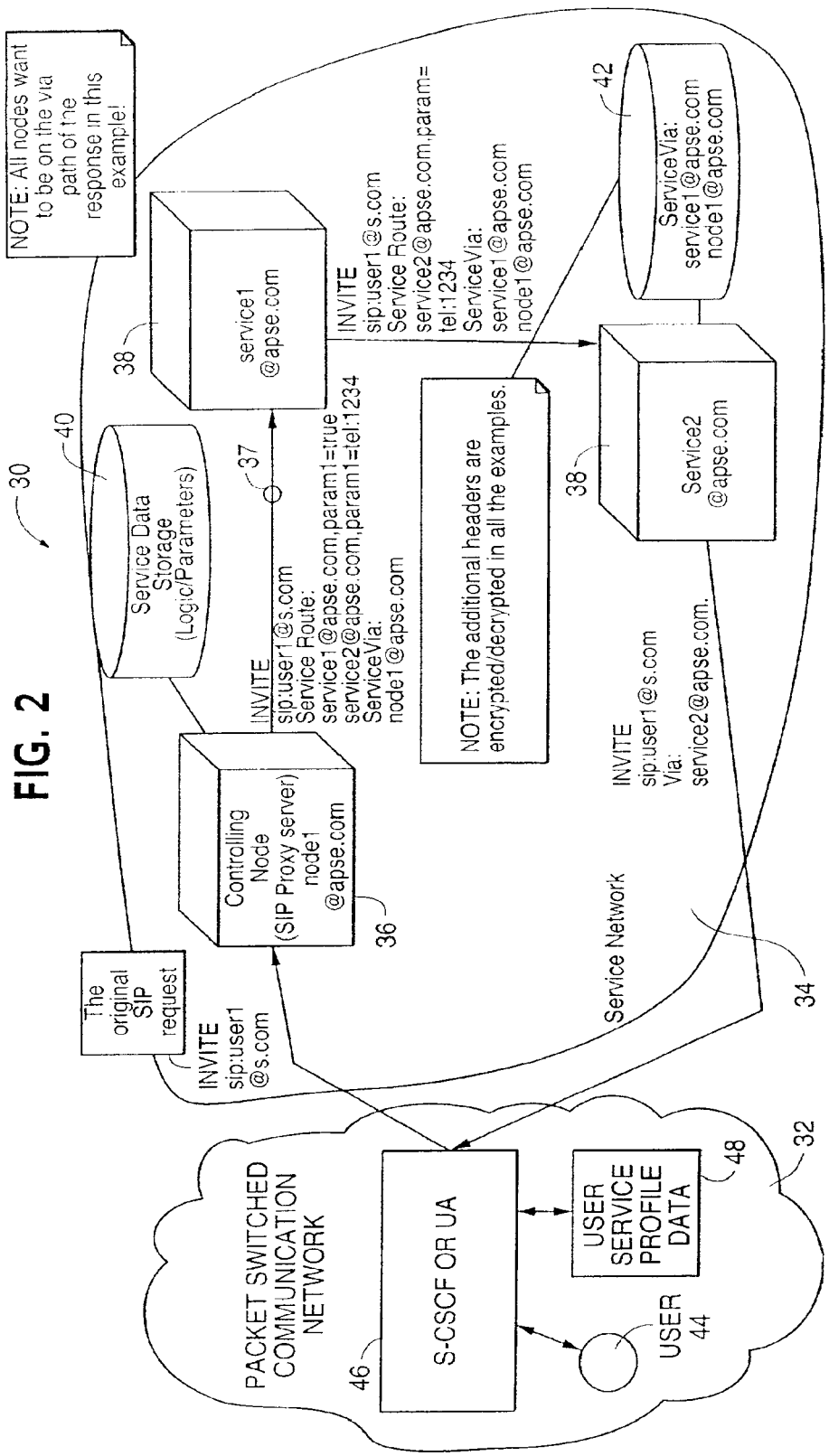
FIG. 2 illustrates the processing of a service request through a service network in accordance with the present invention using Service Route and Service Via headers.
Figure 6:
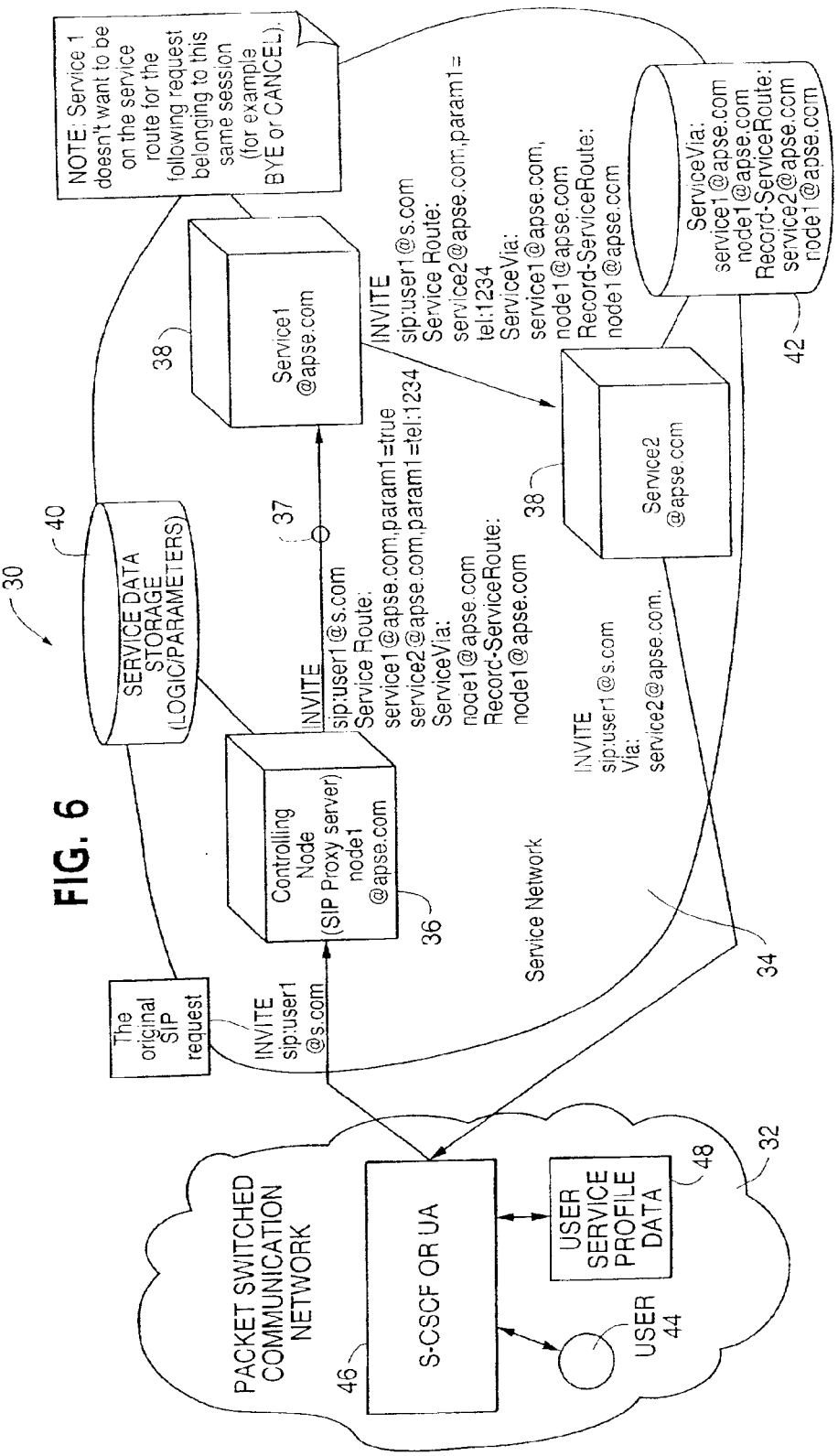
FIG. 6 illustrates a processing of a first request for service in a session having two requests.
Figure 7:
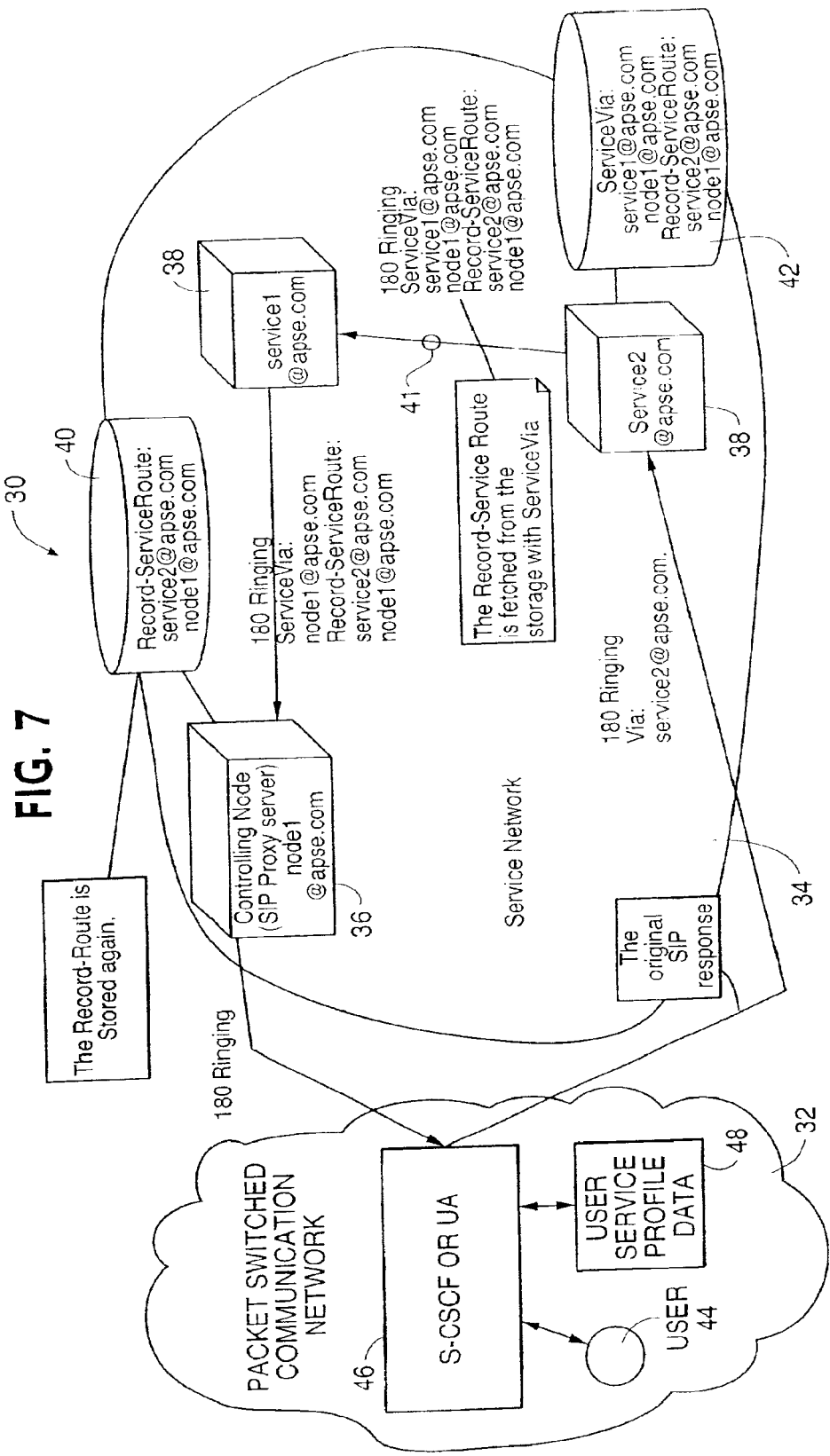
FIG. 7 illustrates the response to the first request of FIG. 6.
Figure 8:
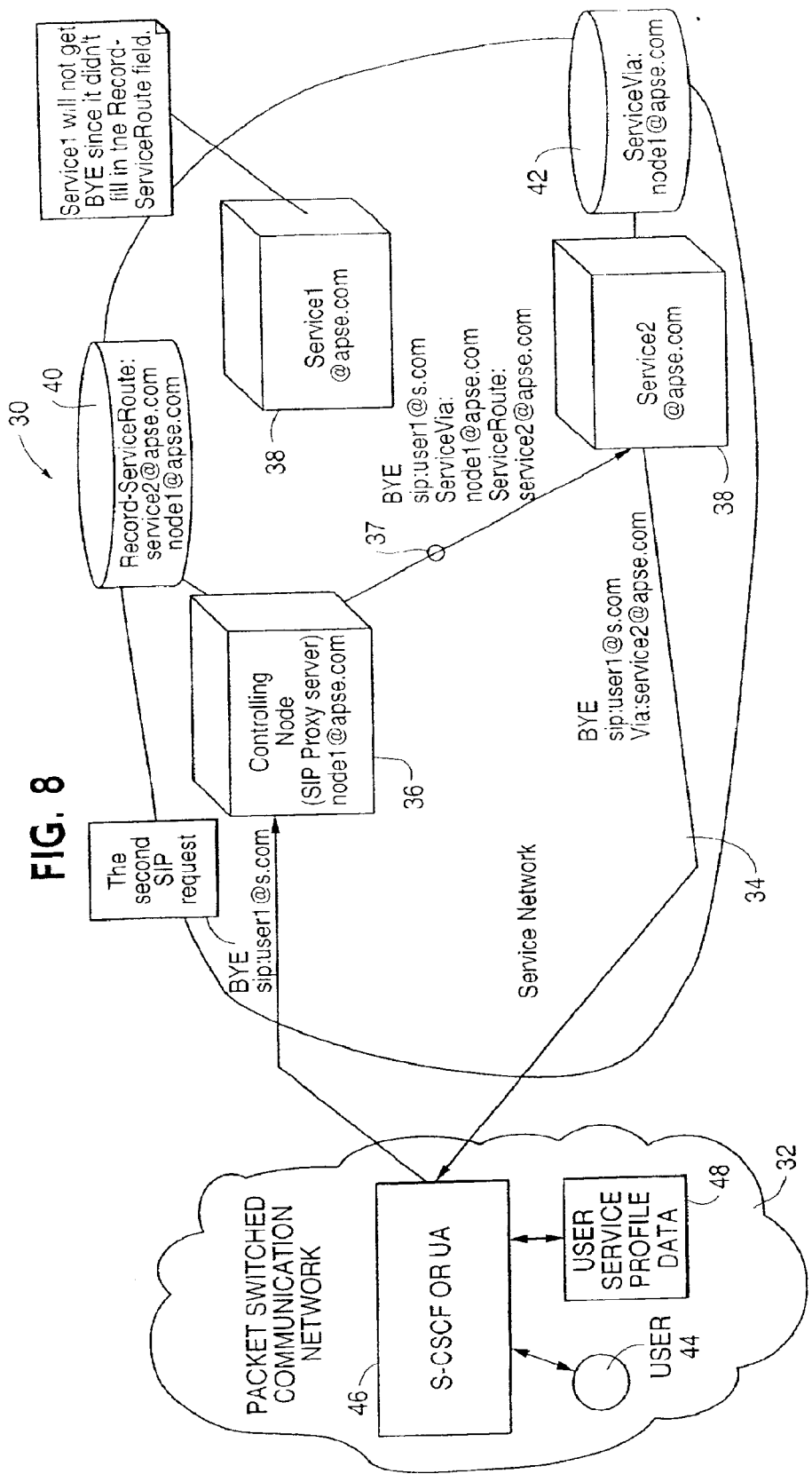
FIG. 8 illustrates the second request of the session in accordance with FIGS. 6 and 7.
Figure 11:
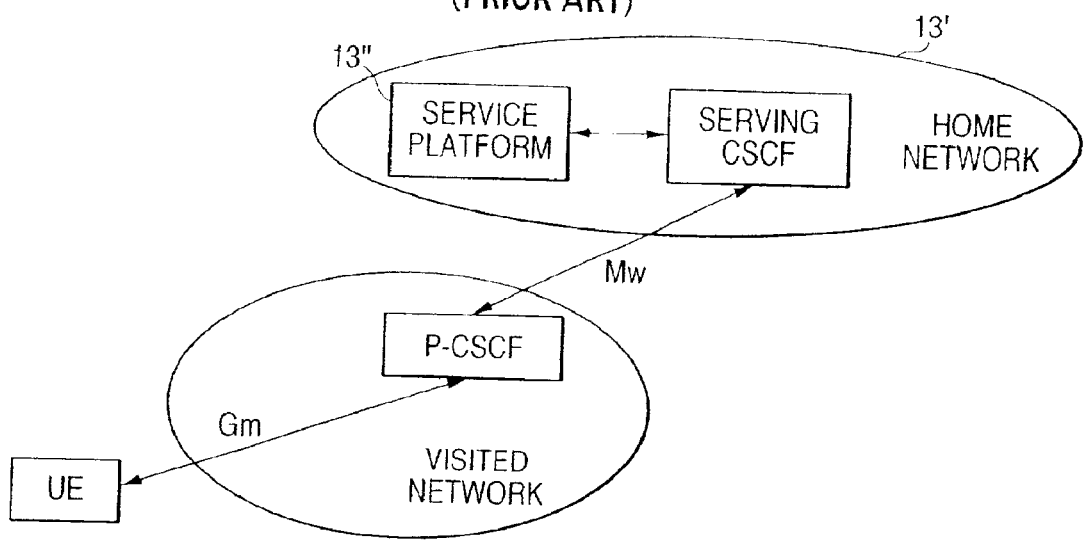
FIGS. 11 and 12 respectively illustrate the prior art accessing of services for users within and outside their home networks.
Figure 12:
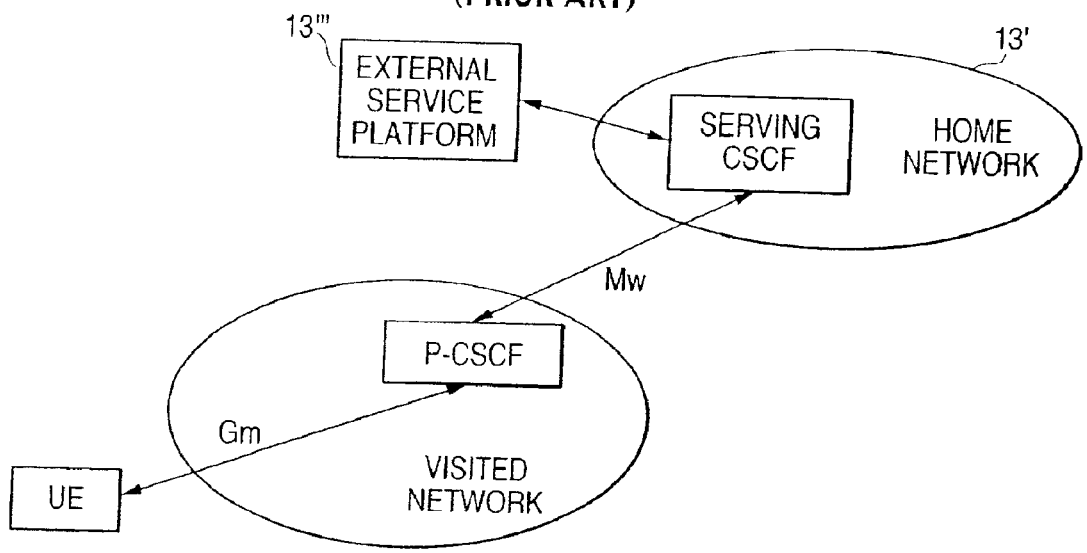

Embodiments of the present invention 30, as illustrated in FIGS. 2, 3 and 6–9, provide a user of a packet switched communication network 32 the ability to obtain diverse services from a service network 34 which are not obtainable from the packet switched communication network 32, which may be the home network of a user 44. The user of the packet switched communication network 32 through a S-CSCF or a UA 46, which may be a SIP UA, obtains services from the service network based upon user service profile data 48 which is stored in the packet switched communication network which may be stored within a HSS. A network entity 46 within the packet switched communication network 32, which may be without limitation the aforementioned S-CSCF or UA 46, transmits a service request message, such as INVITE, to a controlling node hereinafter referred to as a controlling entity 36 within the service network 34. The controlling entity 36 in the service network 34 formulates a service route 37 as illustrated in FIGS. 2, 6, 8 and 9 comprising at least one service providing server 38 which processes the service request on the service route and the allocation of services provided from the controlling entity 36 of how each service providing server is to provide the at least one service. The service request, which is initiated without limitation by the S-CSCF or UA 46 using an INVITE message of the SIP protocol, is transmitted by the service network 34 along the service route 37 including the allocation of services and any service instructions provided by the controlling entity 36 from the controlling entity through each service providing server. The request for service and the at least one service are transmitted from a last service providing server 38, as illustrated in FIGS. 2, 6 and 8, or alternatively, as illustrated in FIG. 9, from the controlling entity 36 on the service route back to the packet switched communication network 32 and thereafter to a network entity such as without limitation the S-CSCF or UA 46. Each of the at least one service providing server 38 attempts to perform the service allocated thereto and passes at least the service request, the allocation and any performed service along the service route 37. A last service providing server 38 or the controlling entity 36 on the service route 37 removes any service routing related information added to the service request by the controlling entity or any preceding service providing server and transmits the at least one service and the service request INVITE to the packet switched communication network in a protocol used by the packet switched communication network and thereafter to the aforementioned network entity.

The packet switched communication network 34 or an entity therein, e.g. S-CSCF 46, generates a response, such as "180 Ringing", to the reception of the service request from the network entity. The response is transmitted to a last service providing server 38 on the service route 37 from which the at least one service was transmitted to the network entity. The last service providing server 38 or controlling entity 36 provides a complete response route 41 through the service network comprising at least one service providing server 38 and/or the controlling entity 36.

Each of the at least one service providing server 38 on the service route 37 has, when receiving the service request, an option to store a response route to at least one of a service providing server and/or the controlling entity 36 to which the response is forwarded thereby and to request receiving the response with the service request. The request to receive the response is transmitted to and stored at a next server 38 on the service route 37 to which the response is to be transmitted. Each service providing server 38 to which the response is transmitted on the response route 41 forwards the response to another service providing server 38 on the response route or to the controlling entity 36 based upon the response route stored thereat.

The service network 34 contains a controlling entity 36, at least one service providing server 38, and a plurality of data storages, which include a service data storage 40, which stores logic and/or parameters utilized by the controlling entity 36 in formulating the service route 37, the allocation of services and instructions to each service providing server and a store 42, which stores a Service Via which represents the return path of a response such as, but not limited to, "180 Ringing" from an entity in the packet switched communication network 32 or the user 44. The packet switched communication network 32 originates the service request for the user 44 from a network entity 46 which may be without limitation an S-CSCF or a UA 46 based upon user service profile data contained in the store 48 which may be without limitation the HSS of the packet switched communication network.

The controlling entity 36 may add several fields to the service request beyond the information pertaining to the service route 37 by the Service Route header and the response route 41 by the Service Via header. A field may be added to indicate any mandatory supported feature of the service request which each service providing server 38 on the service route 37 inspects and issues a response thereto if that service providing server does not support any mandatory supported feature. The last service providing server on the service route removes the field prior to transmission of the service request and the at least one service to the packet switched communication network 32. Each service providing server 38, which provides any mandatory service feature, issues a response to the controlling entity that service processing is ongoing. A field which is the Record Service Route field in FIGS. 6 and 7 may be added by the controlling entity 36 for use with multiple service request sessions to which each service providing server on the route 37 adds a response that records if that service providing server wants to receive subsequent requests in the same session. The last service providing server 38 or the controlling entity 36 on the service route 37 removes or encrypts the Record Service Route field prior to transmission during the session to the packet switched communication network.

Figure 3:
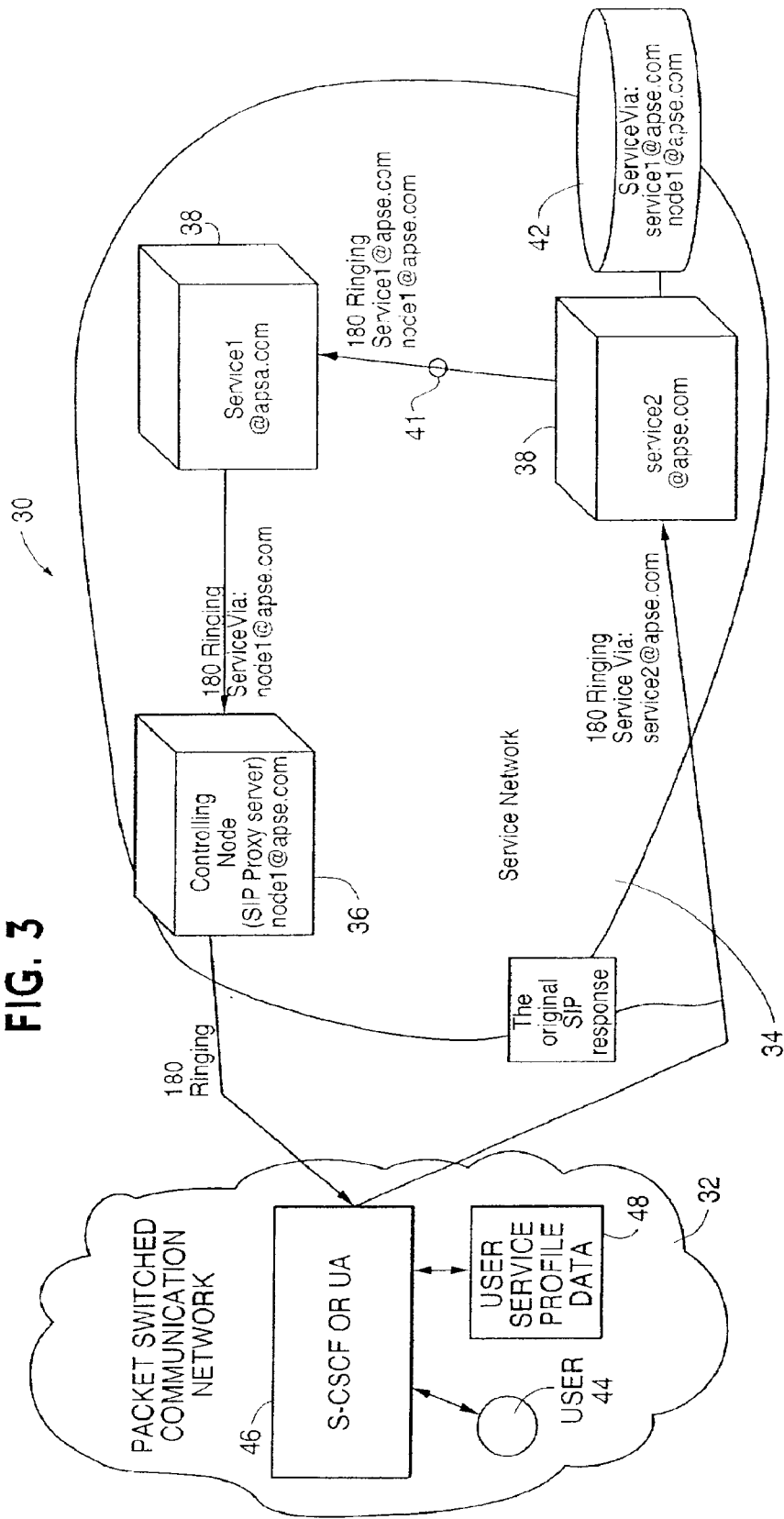
FIG. 3 illustrates processing of a response through a service network in accordance with the present invention using the Service Via header.

A preferred protocol, which may be used with the practice of the invention but to which the invention is not limited, is a modification of the SIP protocol to include additional headers "Service Route" and "Service Via", as illustrated in FIGS. 2, 3 and 6–9, which illustrate the service request formulated using the SIP INVITE instruction and a further modification using the Record Service Route for a session having multiple requests for service as explained above and below with reference to FIGS. 6–8.

The controlling entity 36 constructs the service route 37 for the individual request, e.g. using the SIP INVITE message. The service route construction may be controlled, for example, using CPL script like controlling logic, an example of which is illustrated in FIG. 10. CPL script is described in CPL, Call Processing Language, IETF draft http://www.ietf.org/internet-drafts/draft-ietf-iptelcpl-04.txt which is incorporated herein by reference in its entirety.

The user specific logic and/or user specific service data is either fetched from the user service profile data 48 (which may be stored in a HSS) and is transmitted to the controlling entity 36 or it may be stored in and fetched from the service network specific storage 40 or it may be provided by the SIP UA. The controlling entity 36 evaluates the data/logic forwarded from the S-CSCF and/or UA 46 and/or obtained from the user service profile 48 and/or fetched from storage 40, such as, for example, by traversing a CPL service logic tree of FIG. 10 or the data in general is evaluated.

The service route 37 is formulated during the process by the controlling entity 36. It is possible to have a default route stored in the service controlling entity 36 if the user service profile data 48 does not have specific controlling logic or parameters. The SIP request message "INVITE" is sent to the first execution server 38 where "service 1" is performed as illustrated in the service routes 37 of FIGS. 2, 6 and 9. The URL used in the "INVITE" message sent to the controlling entity 36 is not used when the service route 37 is formulated. The first service execution server 38, which performs "service 1", receives the SIP INVITE service request with the service identification, instructions, and service parameters and executes the first service. The execution of any service by a service providing server 38 can involve modification of the SIP service request itself as, for example, removing attachments and storing them for future use in a storage (not illustrated), starting new SIP sessions for announcements, redrafting the session or running prepaid services. The first service execution server 38 adds itself to the Service Via response route which is the route 41 of the response in FIGS. 3 and 7 from an entity or the user in the packet switched communication network 32. The first service providing server 38 adds itself to the Service Via route if it is interested to receive the response to the SIP INVITE service request. Otherwise, the first service providing server 38 removes itself from the service route 37 and sends the SIP INVITE service request to the next service providing server on the service route 37 which performs "service 2" as illustrated. This service execution process continues until the service route 37 is empty and the last service providing server 38 (FIGS. 2 and 6) or the controlling entity 36 (FIG. 9) transmits the service request and the service back to the packet switched communication network 32 in the protocol used by the packet switched communication network 32, e.g. SIP.

The last service execution server 38 or controlling entity 36 (FIG. 9) either removes the Service Via header and stores the Service Via header for future use in the storage 42 or encrypts the Service Via header so that neither the service network 34 configuration nor the user services can be read outside the service network. In order to obtain a response, the last service providing server 38 (FIGS. 2 and 6) or the controlling entity 36 (FIG. 9) adds its address to the standard SIP Via header. When the SIP response returns (FIGS. 3 and 7), the Service Via header is either fetched from the storage 42 and is added to the SIP response or the first item (or all items) in the Service Via field are decrypted. The response is now routed in the service network 34 according to the Service Via header, as illustrated in FIGS. 3 and 7, which is a modification of the standard SIP Via header.

It should be understood that the communications in the preferred embodiments illustrated in FIGS. 2, 3 and 6–9 between the packet switched communication network 32 and the service network 34 are in accordance with the standard SIP/SIP+ protocol. is the communications are further not restricted to the S-CSCF functionality being located in the same network element with the controlling entity. On the other hand, the communications in the service network 34 are modifications of standard SIP Route and SIP Via headers to Service Route and Service Via fields in FIG. 2, 3 and 6–9. As a result, the operations of the service network 34 are totally transparent to the user 44 in the packet switched communication network 32 and the entities 46 therein, such as the S-CSCF or UA 46. When the response exits the service network 34 as illustrated in FIGS. 3, 7 and 9, the Service Via header is empty and it is removed.

If the service execution fails along the service route 37, the failure is indicated to the controlling entity 36 with a SIP response which his routed according to the current service Via header field so that all of the chained service providing servers 38 are informed of the failure. The controlling entity 36 then has the capability of deciding what actions are to be taken, such as constructing another service route (not illustrated), excluding the failed service providing server 38, or to reject the whole SIP INVITE server request completely in view of the inability to provide the requested service. Furthermore, the service providing servers 36 may also request redirection of a session by sending a "3xx redirect response" of the type used by the SIP protocol towards the controlling entity. In response thereto, the controlling entity 36 may process the "3xx redirect response" and change the service route to involve one or more new service providing servers 38 in response thereto. The reconstructing of a new service route may include diversification of the services and/or parameters which were utilized by the controlling entity 36 in formulating the initial service route 37. In view of at least one of the service providing servers 38 not being able to provide the requested services effectively, the controlling entity 36 restarts the service execution in response to the "3xx redirect response" from one of the service providing servers 38. Furthermore a "reject response" might be issued by a service providing server to implement services such as barring.

It is desirable for the service network 34 to insure that the service route 37 is fully executed to insure that the at least one service providing server 38 properly interprets the service route and the allocation of services. Additional functionality may be utilized by the controlling entity 36 and the last service providing server 38. A standard SIP header "proxy-require" as described in Chapters 6.28 and 6.30 of SIP Protocol Specification, RFC 2543 http://www.ieff.org/rfc/rfc2543.txt, which is incorporated herein by reference in its entirety, is modified such that instead of a UA adding the field, the controlling entity 36 adds this header with a specific option tag, such as, for example, "com.nokia.serviceroute". This requires all of the SIP service providing servers (SIP proxies) 38 to interpret and understand the headers of the present invention, as described herein, and to send a "420 Bad Extension" response if any of the service providing servers 38 do not support the allocation of services of the service route 37. The last service providing server 38 on the service route 37 removes the option from a required options list since network entities in the packet switched communication network 32 are not required to support this function. Erroneous routing will be detected by standard proxies as a result of the above described functionality.

Additionally, a SIP Record-Service Route field may be used as illustrated in the sequence of service requests in FIGS. 6–8. The SIP Record-Service Route field can be used to cause subsequent requests in a single session to be routed in accordance with the first service route 37 (not illustrated) formulated by the controlling entity 36 for each subsequent service request which belongs to the same session. The Record-Service Route function would be completed when the header is set during the routing of the first request for the requested service with the controlling entity 36 adding the same route 37 to all following requests as a service route when the Record-Service Route field is activated (not in FIGS. 6 and 8). The following service requests during a session are then routed as described by the initial service route and the functionality is the same as the SIP Record Route functionality as described in Chapter 6.29 in the aforementioned SIP Protocol Specification with the exception that it is initiated by the controlling entity 36 functioning as a SIP server instead of a SIP client. The Report-Service Route header is removed, stored and restored or encrypted and decrypted in the same manner as the Service Via header. The last service providing server 38 or the controlling entity 36, if it is the last entity in the service route 37, controls the removal, storing and restoring. The controlling entity 36 insures reception of the service request, which is dependent on the features of the packet switched communication network 32, and may include use of a standard Record-Route header or messages between a bordering entity in the packet switched communication network 32, such as the S-CSCF or UA 46 and the controlling entity 36.

The service route 37 may also be constructed dynamically based upon variable events, e.g. time or parameters. For example, a timing function may be used to activate one or more of the service providing servers 38 to accept service requests to perform allocated services after the specified routing of the service request therethrough. This functionality is useful for implementing rapidly changing network wide services to all users 44 for service implementations which are "on the fly" or are based on a calendar schedule.

The preferred embodiment, as described above, in conjunction with FIGS. 2, 3 and 6–9, has a single controlling entity 36 which constructs the service route 37 which the at least one service providing server 38 cannot change by removing or adding additional service providing servers. However, alternatively, the service providing servers 38 may be permitted to add new service providing servers to the service route or to remove service providing servers form the route, such as when the functionality of the removed service providing server becomes obsolete. Another example is that, in the service route parameters stored either in the user service profile data 48 or the service data storage 40, it may be indicated if a specific service route allocation of services can be removed. In view of the nature of the service network 34 being private, it is assumed that all of the service providing servers 38 may be configured to perform the allocation of correct routing to implement a new service route and/or the allocation of services to be provided to the user 44. The aforementioned variations are compatible with the service route scheme of the invention in the service network 34, but require planning and service management support, such as determining which service providing servers are permitted to alter the service route.

As stated above, in a preferred embodiment of the present invention, two headers are added to the standard SIP protocol, which are the Service Route and Service Via headers, as described above in association with FIGS. 2, 3 and 6–9. Moreover, the Record-Service Route may be added to increase the efficiency of specifying the route for repeated services during a session. Moreover, the headers may be of a private nature in view of the service network 34 being private with all of the service headers being removed or encrypted before either the service request or service response enters the packet switch communication network 32.

Figure 4:
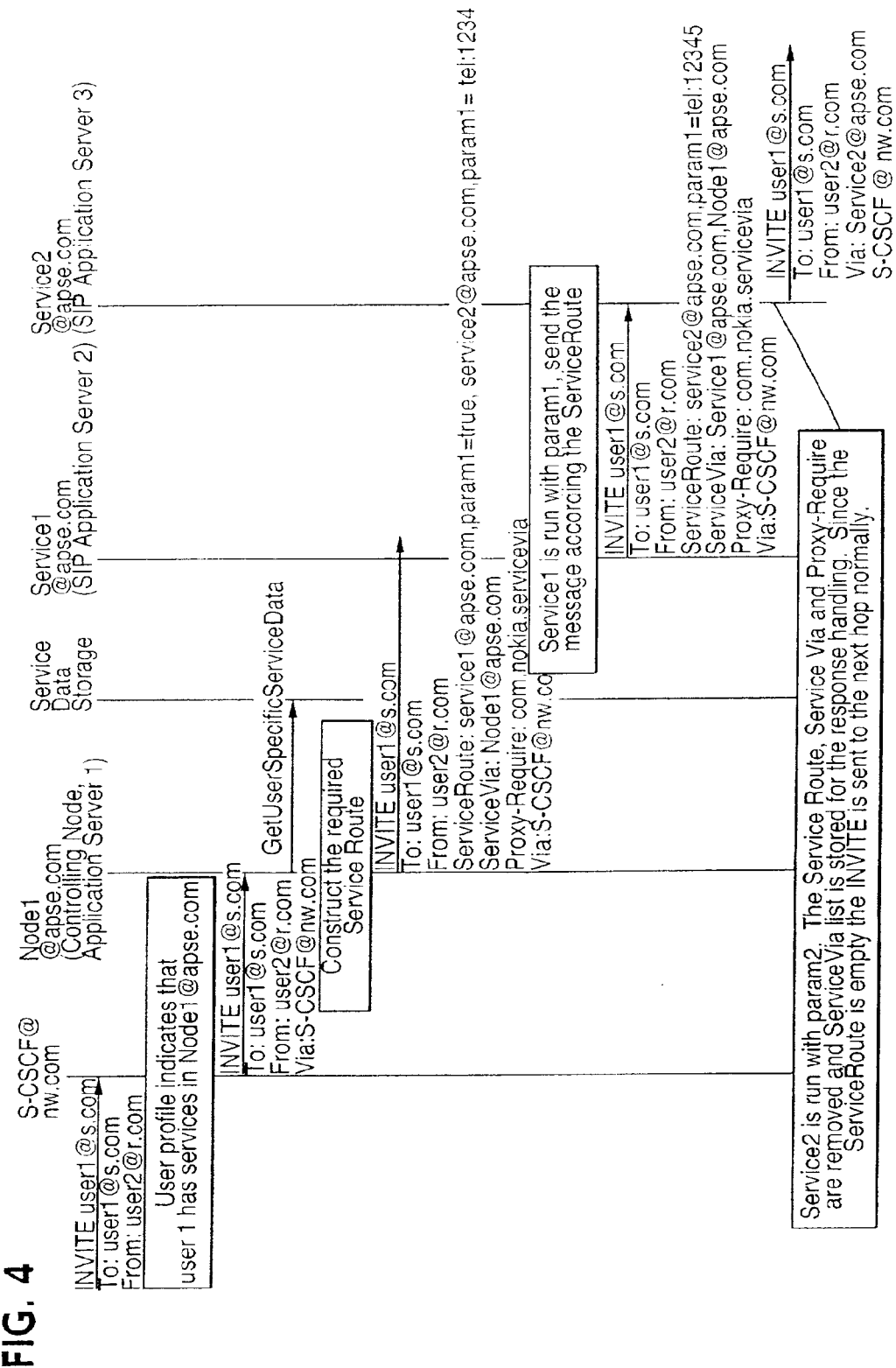
FIG. 4 illustrates a sequence diagram of the processing of a service request in accordance with FIG. 2.

FIG. 4 illustrates a sequence diagram of the service request illustrated in FIG. 2 beginning from the INVITE service request addressed to the controlling entity 36 of the service network 34 and ending with the transmission of the INVITE service request to the second service providing server 38.

Figure 5:
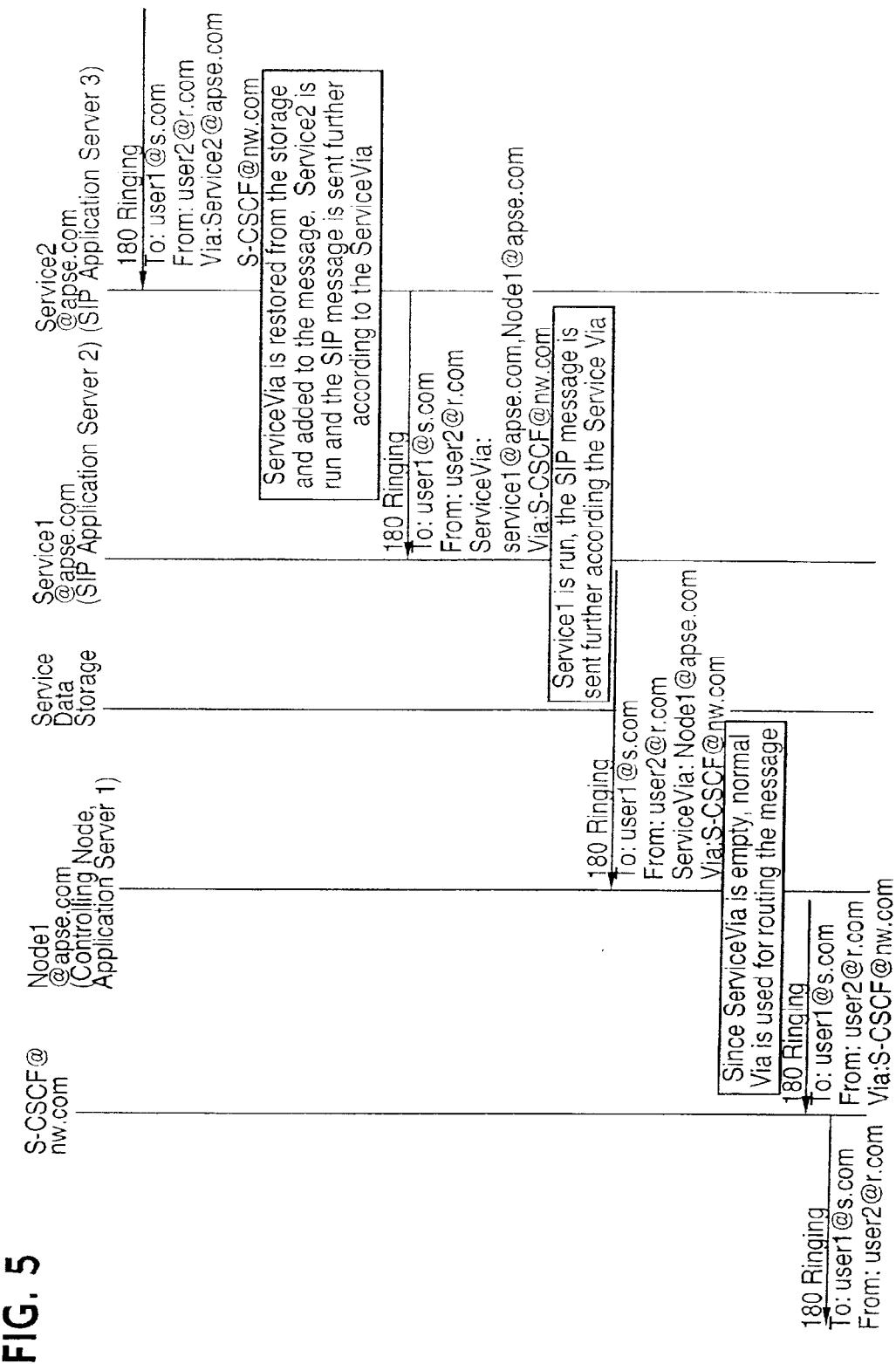
FIG. 5 illustrates a sequence diagram of the processing of a response in accordance with FIG. 3.

FIG. 5 illustrates a sequence diagram for the response illustrated in FIG. 3.

FIGS. 6, 7 and 8 respectively illustrate a first service request, the service response thereto and a second service request in a session.

FIG. 9 illustrates a service request similar to the service request of FIG. 2 except that the return of the service request is transmitted from the controlling entity 36 instead of the last service providing server 38 on the service route as illustrated in FIG. 2.

FIG. 10 illustrates an example of the construction of the service route using CPL script with corresponding extensions.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A method of providing at least one service obtained from a service network for a user in a packet switched communication network comprising:

originating at an originating network entity in the packet switched communication network a service request which is transmitted to a controlling entity in the service network, the service request triggering at least one service to be provided to the user by the service network;

the controlling entity formulating a service route through the service network comprising a plurality of service providing servers within the service network with each service providing server processing the service request on the service route and an allocation of how each service providing server is to provide the at least one service; and transmitting the service request, the allocation and any service instructions along the service route from the controlling entity through each service providing server and then the request for service and the at least one service from a last service providing server or the controlling entity on the service route to the packet switched communication network and thereafter to a network entity in the packet switched communication network; and wherein each of the plurality of service providing servers attempts to perform the service allocated thereto and passes at least the service request, the allocation and any service instructions to any next service providing server remaining on the service route.

2. A method in accordance with claim 1 wherein:

the service request is made using the session initiation protocol (SIP);

and the the controlling entity is a proxy server.

3. A method in accordance with claim 1 wherein:

a last service providing server or the controlling entity on the service route removes any service routing related information added to the service request by the controlling entity or any preceding service providing server and transmits the at least one service and the service request in a protocol used by the packet switched communication network and thereafter to a network entity in the packet switched communication network.

4. A method in accordance with claim 1 wherein:

a last service providing server or the controlling entity on the service route encrypts any service routing related information added to the service request by the controlling entity or any preceding service providing server and transmits the at least one service, the service request and the encrypted information in a protocol used by the packet switched communication network to the packet switched communication network and thereafter to a network entity in the packet switched communication network.

5. A method in accordance with claim 1 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the at least one service providing server on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

6. A method in accordance with claim 2 wherein:

the packet switched communication network or an entity in the packet switched communication generates a response to reception of the service request which is transmitted to a last service providing server on the service route with the last service providing server or the controlling entity providing a complete response route through the service network comprising at least one of the plurality of service providing servers and/or the controlling entity;

each of the at least one service providing server on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

7. A method in accordance with claim 3 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the at least one service providing server on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

8. A method in accordance with claim 4 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the at least one service providing server on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

9. A method in accordance with claim 1 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

10. A method in accordance with claim 2 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

11. A method in accordance with claim 3 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

12. A method in accordance with claim 4 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

13. A method in accordance with claim 5 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

14. A method in accordance with claim 6 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

15. A method in accordance with claim 7 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

16. A method in accordance with claim 8 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

17. A method in accordance with claim 1 wherein:

a response route is transmitted with the service request to which is added as the service request is routed along the service route each service providing server and the controlling entity which is to receive the response;

the last service providing server or the controlling entity on the service route causes storage of a complete response route which is used by the last service providing server or the controlling entity to initiate the response route through which the response is routed upon receipt from the packet switched communication network; and at least one of the controlling entity or a last service providing server on the response route transmit the response in a protocol used by the packet switched communication network to the packet switched communication network and thereafter to a network entity in the packet switched communication.

18. A method in accordance with claim 17 wherein:

the controlling entity or a service providing server on the response route which transmits the response to the packet switched communication network removes any service routing related information added to the response by the service network.

19. A method in accordance with claim 2 wherein:

the last service providing server decrypts any encrypted information added to the service request by the last service providing server to create the response route through which the response is routed upon receipt from the packet switched communication network;

each service providing server which decides to be added to the response route stores a remainder to the service request of the response route through which the response route runs and the response is forwarded; and at least one of the controlling entity or a last service providing server on the response route transmit the response in a protocol used by the packet switched communication network to the packet switched communication network and thereafter to a network entity.

20. A method in accordance with claim 19 wherein:

the controlling entity or a service providing server on the response route which transmits the response to the packet switched communication network removes any service routing related information added to the response by the service network.

21. A method in accordance with claim 3 wherein:

the last service providing server decrypts any encrypted information added to the service request by the last service providing server to create the response route through which the response is routed upon receipt from the packet switched communication network;

each service providing server which decides to be added to the response route stores a remainder to the service request of the response route through which the response route runs and the response is forwarded; and at least one of the controlling entity or a last service providing server on the response route transmit the response in a protocol used by the packet switched communication network to the packet switched communication network and thereafter to a network entity.

22. A method in accordance with claim 21 wherein:

the controlling entity or a service providing server on the response route which transmits the response to the packet switched communication network removes any service routing related information added to the response by the service network.

23. A method in accordance with claim 4 wherein:

the last service providing server decrypts any encrypted information added to the service request by the last service providing server to create the response route through which the response is routed upon receipt from the packet switched communication network;

each service providing server which decides to be added to the response route stores a remainder to the service request of the response route through which the response route runs and the response is forwarded; and at least one of the controlling entity or a last service providing server on the response route transmit the response in a protocol used by the packet switched communication network to the packet switched communication network and thereafter to a network entity.

24. A method in accordance with claim 23 wherein:

the controlling entity or a service providing server on the response route which transmits the response to the packet switched communication network removes any service routing related information added to the response by the service network.

25. A method in accordance with claim 1 wherein:

the packet switched communication network includes a storage which stores information pertaining to the at least one service to be provided to the user; and the originating network entity accesses the storage to formulate the service request.

26. A method in accordance with claim 1 wherein:

the service network includes a storage which stores at least parameters pertaining to the at least one service to be provided to the user.

27. A method in accordance with claim 1 wherein:

the service request is formulated by the controlling entity using service parameters with the service parameters being forwarded with service instructions and the service request to each service providing server.

28. A method in accordance with claim 27 wherein:

the service parameters are fetched from a storage in the packet switched communications network.

29. A method in accordance with claim 27 wherein:

the service parameters are fetched from a storage in the service network.

30. A method in accordance with claim 1 wherein:

each service providing server interprets the service request and signals the controlling entity if the service providing server does not support any part of the service request.

31. A method in accordance with claim 1 wherein:

the controlling entity adds a field to the service request to indicate any mandatory supported service feature of the service request which each service providing server on the service route inspects and issues a response thereto if that service providing server does not support any mandatory supported feature; and the last service providing server or the controlling entity on the service route removes the field prior to transmission of the service request and the at least one service to the packet switched communication network.

32. A method in accordance with claim 31 wherein:

each service providing server which provides any mandatory supported service feature issues a response to the controlling entity that service processing is ongoing.

33. A method in accordance with claim 1 wherein:

the request for service is part of a session which contains multiple requests for service which are all addressed to the controlling entity; and the controlling entity formulates the service route during a first service request of the session which is used for subsequent service requests of the session.

34. A method in accordance with claim 1 wherein:

the controlling entity adds a field to the first service request to which each service providing server on the service route adds a response that records if that service providing server wants to receive subsequent requests in the same session; and the last service providing server or the controlling entity on the service field removes the field prior to any transmission during the session to the packet switched communication network.

35. A method in accordance with claim 1 wherein:

an allocation of the at least one service performed by the service network is changed dynamically to change services performed by individual service providing servers.

36. A method in accordance with claim 1 wherein:

one of the at least one service providing servers adds at least one additional service providing server to the service route to provide the at least one service.

37. A network which provides at least one service to a user of a packet switched communication network including an originating network entity, the at least one service being obtained from a service network comprising a controlling entity and a plurality of service providing servers wherein:

the originating network entity in the packet switched communication network originates a service request which is transmitted to the controlling entity in the service network, the service request triggering at least one service to be provided to the user;

the controlling entity formulating a service route comprising a plurality of service providing servers with each service providing server processing the service request and an allocation of how each service providing server is to provide the at least one service;

the service request, the allocation and any service instructions are transmitted by the service network along the service route from the controlling entity through each service providing server and then the request for service and the at least one service from a last service providing server or the controlling entity on the service route to the packet switched communication network and thereafter to the network entity in the packet switched communication network; and each of the plurality of service providing servers attempts to perform the service allocated thereto and passes at least the service request, the allocation and any service instructions to any next service providing server remaining on the service route.

38. A network in accordance with claim 37 wherein:

the service request is made using the session initiation protocol (SIP);

and the the controlling entity is a proxy server.

39. A network in accordance with claim 37 wherein:

a last service providing server or the controlling entity on the service route removes any service routing related information added to the service request by the controlling entity or any preceding service providing server and transmits the at least one service and the service request in a protocol used by the packet switched communication network to the packet switched communication network and thereafter to a network entity in the packet switched communication network.

40. A network in accordance with claim 37 wherein:

a last service providing server or the controlling entity on the service route encrypts any service routing related information added to the service request by the controlling entity or any preceding service providing server and transmits the at least one service, the service request and the encrypted information in a protocol used by the packet switched communication network to the packet switched communication network and thereafter to a network entity.

41. A network in accordance with claim 37 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the service providing servers on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

42. A network in accordance with claim 38 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the service providing servers on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

43. A network in accordance with claim 39 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the service providing servers on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

44. A network in accordance with claim 40 wherein:

the packet switched communication network or an entity in the packet switched communication generates a response to reception of the service request which is transmitted to a last service providing server or the controlling entity on the service route with the last service providing server or the controlling entity providing a complete response route through the service network comprising at least one of the plurality of service providing servers and/or the controlling entity;

each of the service providing servers on the service route has, when receiving the service request, an option to store a response route to at least one of a service providing server and/or the controlling entity to which the response is forwarded thereby and to request receiving the response with the service request and the request to receive the response being transmitted to and stored at a next server on the service route that the response is to be transmitted thereto; and each service providing server to which the response is transmitted on the response route forwards the response to another service providing server on the response route or to the controlling entity based upon the response route stored thereat.

45. A network in accordance with claim 37 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

46. A network in accordance with claim 38 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

47. A network in accordance with claim 39 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

48. A network in accordance with claim 40 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

49. A network in accordance with claim 41 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

50. A network in accordance with claim 42 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

51. A network in accordance with claim 43 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

52. A network in accordance with claim 44 wherein:

a response route is transmitted with the service request to which is added as the service request is routed along the service route each service providing server and the controlling entity which is to receive the response;

the last service providing server or the controlling entity on the service route transmits with the service request and the at least one service an address of the last service providing server or the controlling entity which is to receive the response from the packet switched communication network or an entity within the packet switched communication network; and thereafter the response is transmitted from the packet switched communication network to the address.

53. A network in accordance with claim 37 wherein:

a response route is transmitted with the service request to which is added as the service request is routed along the service route each service providing server and the controlling entity which is to receive the response;

the last service providing server or the controlling entity on the service route causes storage of a complete response route which is used by the last service providing server or the controlling entity to initiate the response route through which the response is routed upon receipt from the packet switched communication network;

at least one of the controlling entity or a last service providing server on the response route transmit the response in a protocol used by the packet switched communication network to the packet switched communication network and thereafter to a network entity in the packet switched communication network.

54. A network in accordance with claim 53 wherein:

the controlling entity or a service providing server on the response route which transmits the response to the packet switched communication network removes any service routing related information added to the response by the service network.

55. A network in accordance with claim 38 wherein:

a response route is transmitted with the service request to which is added as the service request is routed along the service route each service providing server and the controlling entity which is to receive the response;

the last service providing server or the controlling entity on the service route causes storage of a complete response route which is used by the last service providing server or the controlling entity to initiate the response route through which the response is routed upon receipt from the packet switched communication network;

at least one of the controlling entity or a last service providing server on the response route transmit the response in a protocol used by the packet switched communication network to the packet switched communication network and thereafter to a network entity in the packet switched communication network.

56. A network in accordance with claim 55 wherein:

the controlling entity or a service providing server on the response route which transmits the response to the packet switched communication network removes any service routing related information added to the response by the service network.

57. A network in accordance with claim 39 wherein:

a response route is transmitted with the service request to which is added as the service request is routed along the service route each service providing server and the controlling entity which is to receive the response;

the last service providing server or the controlling entity on the service route causes storage of a complete response route which is used by the last service providing server or the controlling entity to initiate the response route through which the response is routed upon receipt from the packet switched communication network;

at least one of the controlling entity or a last service providing server on the response route transmit the response in a protocol used by the packet switched communication network to the packet switched communication network and thereafter to a network entity in the packet switched communication network.

58. A network in accordance with claim 57 wherein:

the controlling entity or a service providing server on the response route which transmits the response to the packet switched communication network removes any service routing related information added to the response by the service network.

59. A network in accordance with claim 40 wherein:

a response route is transmitted with the service request to which is added as the service request is routed along the service route each service providing server and the controlling entity which is to receive the response;

the last service providing server or the controlling entity on the service route causes storage of a complete response route which is used by the last service providing server or the controlling entity to initiate the response route through which the response is routed upon receipt from the packet switched communication network;

at least one of the controlling entity or a last service providing server on the response route transmit the response in a protocol used by the packet switched communication network to the packet switched communication network and thereafter to a network entity in the packet switched communication network.

60. A network in accordance with claim 59 wherein:

the controlling entity or a service providing server on the response route which transmits the response to the packet switched communication network removes any service routing related information added to the response by the service network.

61. A network in accordance with claim 37 wherein:

the packet switched communication network includes a storage which stores information pertaining to the at least one service to be provided to the user; and the originating network entity accesses the storage to formulate the service request.

62. A network in accordance with claim 37 wherein:

the service network includes a storage which stores at least parameters pertaining to the at least one service to be provided to the user; and the controlling entity accesses the storage to formulate the service request.

63. A network in accordance with claim 37 wherein:

the service request includes service parameters added by the controlling entity to the service request with the service parameters being used by the service network in obtaining the at least one service.

64. A network in accordance with claim 63 wherein:

the service parameters are fetched from a storage in the packet switched communications network.

65. A network in accordance with claim 63 wherein:

the service parameters are fetched from a storage in the service network.

66. A network in accordance with claim 37 wherein:

each service providing server interprets the service request and signals the controlling entity if the service providing server does not support any part of the service request.

67. A network in accordance with claim 37 wherein:

the service request is formulated by the controlling entity using service parameters with the service parameters being forwarded with the service instructions and the service request to each service providing server.

68. A network in accordance with claim 67 wherein:

the service parameters are fetched from a storage in the packet switched communications network.

69. A network in accordance with claim 67 wherein:

the service parameters are fetched from a storage in the service network.

70. A network in accordance with claim 37 wherein:

the request for service is part of a session which contains multiple requests for service which are all addressed to the controlling entity; and the controlling entity sets the service route during a first service request of the session which is used for subsequent service requests of the session.

71. A network in accordance with claim 37 wherein:

the controlling entity adds a field to the first service request to which each service providing server on the service route adds a response that records if that service providing server wants to receive subsequent requests in the same session; and the last service providing server on the service route or the controlling entity removes the field prior to transmissions during the session to the packet switched communication network.

72. In a system which provides at least one service for a user in a packet switched communication network including an originating network entity which originates a service request triggering the at least one service and a service network including a plurality of service providing servers, a service network entity comprising:

a controlling entity in the service network to which the service request is transmitted, the controlling entity formulating a service route comprising plurality of one service providing servers which processes the service request on the service route and an allocation of how each service providing server is to provide the at least one service, and wherein the service network transmits the service request, the allocation and any performed service instructions along the service route from the controlling entity through each service providing server and then the request for service and the at least one service from a last service providing server or the controlling entity on the service route to the packet switched communication network and thereafter to a network entity in the packet switched communication, and each of the plurality of service providing servers attempts to perform the service allocated thereto and passes at least the service request, the allocation and any service instructions to any next service providing server remaining on the service route.

73. A service network entity in accordance with claim 72 wherein:
the controlling entity supports the session initiation protocol (SIP).

74. A service network entity in accordance with claim 72 wherein:
each service providing server interprets the service request and signals the controlling entity if the service providing server does not support any part of the service request.

75. A service network entity in accordance with claim 72 wherein:
the controlling entity adds a field to the service request to indicate any mandatory supported service feature of the service request which each service providing server on the service route inspects and issues a response if that service providing server does not support any mandatory supported service; and
the last service providing server on the service route removes the field prior to transmission of the service request and the at least one service request to the packet switched communication network.

76. A service network entity in accordance with claim 75 wherein:
each service providing server which provides any mandatory supported service features issues a response to the controlling entity that service processing is ongoing.

77. A service network entity in accordance with claim 72 wherein:
the request for service is part of a session which contains multiple requests for service which are all addressed to the controlling entity; and
the controlling entity sets the service route during a first service request of the session which is used for subsequent service requests of the session.

78. A service network entity in accordance with claim 72 wherein:
the controlling entity adds a field to the first service request to which each service providing server on the service route adds a response that records if that service providing server wants to receive subsequent requests in the same session; and
the last service providing server on the service route or the controlling entity removes the field prior to transmissions during the session to the packet switched communication network.

79. In a system which provides at least one service for a user in a packet switched communication network including an originating network entity which originates a service request triggering the at least one service and a service network including a controlling entity to which the service request is transmitted and which formulates a service route, a service network comprising:

a plurality of service providing servers which processes the service request on the service route and an allocation provided by the controlling entity of how the plurality of service providing servers are to provide at least part of the at least one service; and wherein
the service network transmits the service request, the allocation and any service instructions along the service route from the controlling entity through each service providing server and then the request for service and the at least one service from a last service providing server or the controlling entity on the service route to the packet switched communication network and thereafter to a network entity in the packet switched communication; and
each of the plurality of service providing servers attempts to perform the service allocated thereto and passes at least the service request, the allocation and any service instructions to any next service providing server remaining on the service route.

80. A service network in accordance with claim 79 wherein:
each service network entity supports the session initiation protocol (SIP).

* * * * *